May 14, 1929. E. H. PERCY 1,713,350
POWER OPERATED DOGGING MECHANISM
Filed May 29, 1926
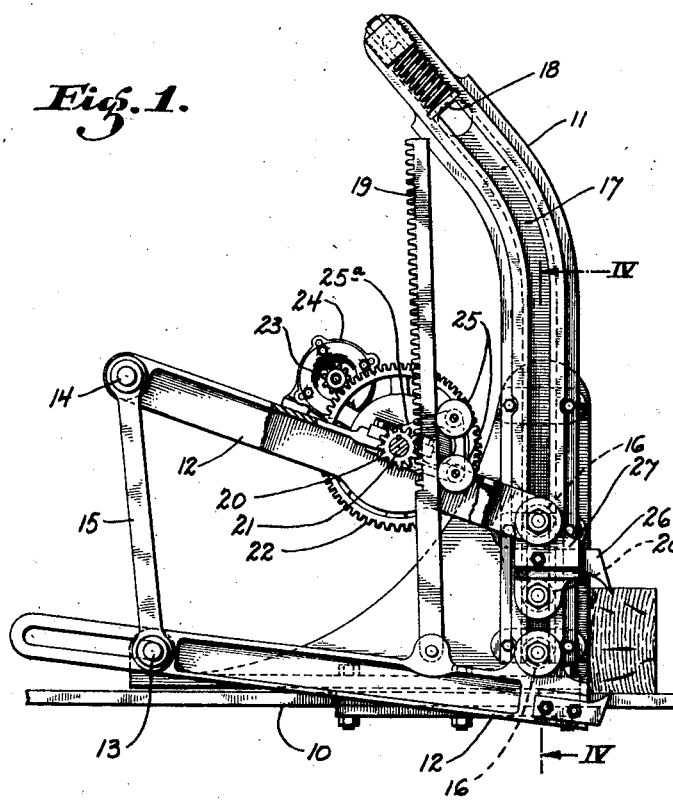
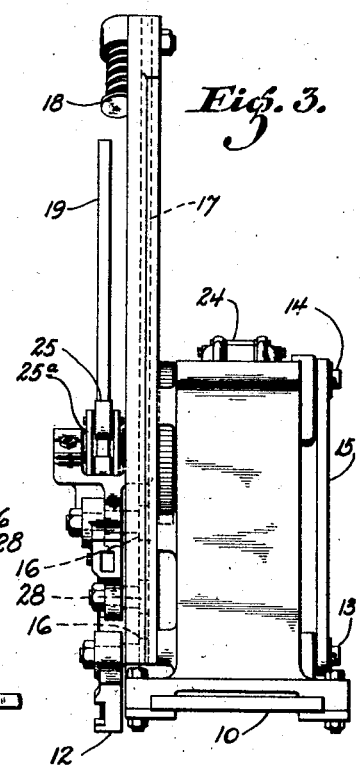
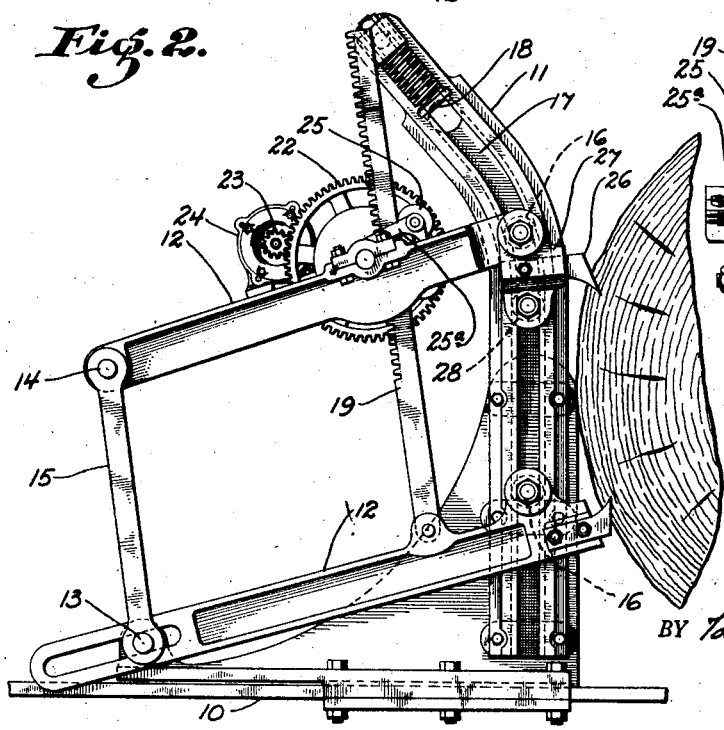
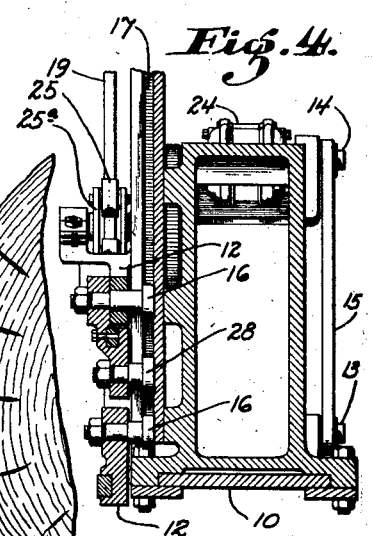
INVENTOR.
Edwin H. Percy.
BY
ATTORNEYS.

Patented May 14, 1929.

1,713,350

UNITED STATES PATENT OFFICE.

EDWIN H. PERCY, OF FORT BRAGG, CALIFORNIA, ASSIGNOR, BY MESNE ASSIGNMENTS, TO THE PRESCOTT COMPANY, A CORPORATION OF MICHIGAN.

POWER-OPERATED DOGGING MECHANISM.

Application filed May 29, 1926. Serial No. 112,555.

This invention relates to power-operated dogging mechanism for sawmill carriages and has particular reference to what is termed "tong dogs." Such dogs consist of a pair of dog arms mounted to swing toward and from each other in a vertical plane on the knee of a carriage, one dog engaging the top of the log and the other engaging the bottom thereof. By this gripping of the top and bottom of the log rather than the sides thereof, no injury is done to the backboard which is the term applied to the sawed face of the log resting against the knee. Such a mechanism is disclosed in my co-pending application Serial No. 750,968 filed Nov. 20, 1924. The object of my invention herein is to provide an improved mounting for one of the dogs, whereby the same engages and holds the log with greater facility.

In the accompanying drawing, I have illustrated one specific embodiment of my invention, but it will be understood that the invention can be otherwise embodied and that the drawing is not to be construed as defining or limiting the scope of the invention, the claims appended to this specification being relied upon for that purpose.

Referring to the figures of the drawing:

Figure 1 is a side elevation of a knee of a sawmill carriage embodying my invention.

Figure 2 is a like view showing the dogs in another position.

Figure 3 is a front view of the knee.

Figure 4 is a fragmentary sectional view taken on line IV—IV of Fig. 1.

The invention herein illustrated includes a head block 10 and a knee 11. As in the usual sawmill carriage, the knee is slidable on the head block, its movements being controlled by set works and taper devices which form no part of the present invention. On the knee frame is mounted a pair of dogs 12, which are termed "tong dogs". The lower dog is pivotally mounted on a pin 13, with a slotted connection so as to allow some endwise movement. The upper dog is pivoted on a pin 14, which is carried by a pair of swinging arms 15 connected to a pin 13. Both dogs have a lug or boss 16 slidably working in a guide-way 17 on the knee. This guide-way is vertically disposed and is curved at the upper end of the knee, so that the upper dog will be retracted out of the way of the log when not in use. There is a spring or rubber bumper 18 at the upper end of the guideway, forming a resilient stop for the upper dog.

The lower dog has a toothed rack 19 pivotally connected to it, and this rack extends up through a bifurcated portion in the upper dog, where it meshes with a pinion 20 fixed upon a shaft 21 journaled on said upper dog. There is a relatively large spur gear 22 on the outer end of this shaft, which meshes with a pinion 23 on the shaft of an electric motor 24, which motor is mounted upon the upper dog and swings therewith.

The rack 19 is guided and held in mesh with the pinion 20 by means of a pair of rollers 25 engaging with the rear edge of the rack and carried by a frame 25ª, which is pivotally mounted on the shaft 21. This form of guide will allow the rack to change its angular position and will at all times keep the rack in engagement with the driving pinion.

Normally the dogs are separated, the lower one resting at the bottom of the knee, and the upper one being in contact with the bumper 18 and held in this position by suitable brakes on the motor. When the motor is set in operation it causes the upper dog to descend along the rack, and when the upper dog strikes the log the lower dog will be pulled upwardly by the rack. A frictional connection is provided as shown in my said co-pending application so that when both dogs are sufficiently engaged with the log, the motor and spur gear 22 may continue to rotate.

In practice there are several of these dogging devices on a single carriage, and all motors are under control of the set-works operator. When a log is rolled onto the carriage the set-works operator closes the switch so as to set the motors in operation in a direction to sink the dogs into the log. After the dogs are sufficiently engaged with the log the motor and spur gear 22 may continue to rotate, on account of the friction connection between said spur gear and the shaft 21. This will prevent sudden jars and strains upon the motor, and the operator may cut out the motor at his leisure. Usually these motors are provided with automatic brakes, so that after the dogs are engaged and the motors stopped, accidental releasing of the dogs would be prevented. When the log is to be turned or taken off the carriage, the operator throws the switch so as to reverse the motor, and in this way the dogs are forced open.

When the dogs reach the limit of movement permitted by the guide-way 17, the friction connection will again come into play, and allow the motor and spur gear 22 to rotate after the dogs have ceased to move. Thus the friction connection serves both in driving the dogs into the log and releasing them, and prevents sudden shocks to the motor, and generally reduces wear and tear on the entire mechanism.

It will of course be understood that while I have herein illustrated the arms 12 as operated by an electric motor, the same can in like manner be operated by substituting any of various well known power means for the rack 19 and its cooperating mechanism.

The principal novelty of my invention herein resides in so mounting the upper dog that it will engage the log at the proper angle and hold the same with greater security. The upper dog tooth 26 is carried by a shoe 27 pivotally connected at its upper end to the boss 16 on the free end of the upper arm 12 and having a lug or boss 28 at its lower end slidably engaging in the guideway 17. This connection permits swinging movement of the member and tooth in accordance with the line of direction of the guideway 17. Thus, when a timber of small diameter, as illustrated in Fig. 1, is to be engaged, the tooth 26 is in a right angular position in the lower straight part of the guideway. In such position, the dog engages the timber at the most effective angle. When a large log is to be engaged, as shown in Fig. 2, the member 27 and tooth 26 are tipped backward by the curved upper portion of the guideway and the tooth engages the log more effectively as will be seen and understood by referring to Fig. 2.

The mode of carrying the tooth or spur 26 on the upper dog arm also provides against accidental release of the dog, should the log start to roll away from the knee. In such an emergency the tendency would be to pull upwardly and outwardly on the spur, and this would cause the lug or boss 28 to bind against the side of the guideway, and through the friction set up thereby, prevent the upper dog arm from being raised.

Having thus described my invention, what I claim is:

1. Mechanism for dogging a log, comprising in combination a knee having a guideway therein extending vertically for a portion of the way and curving rearwardly at the upper portion of the knee, a pair of arms mounted for movement towards and from each other, a dog carried by each arm, and means for pivotally connecting one of said dogs to its arm, said means comprising a shoe slidable in the guideway on the knee, and means for maintaining said shoe in alignment with the guideway.

2. Mechanism for dogging a log, comprising in combination a knee having a guideway therein extending vertically for a portion of the way and curving rearwardly at the upper part of the knee, a pair of arms mounted for movement towards and from each other, a dog carried by each arm, and a mounting for one of said dogs, comprising a shoe slidable along the guideway of the knee, a boss pivotally connecting said shoe to the upper dog arm and slidable in said guideway, and a second boss on the lower half of said shoe and also slidable in said guideway whereby the said shoe is made to follow the course of the guideway in substantial alinement therewith.

3. A dogging device comprising upper and lower dogs relatively movable on a knee for gripping a log, actuating mechanism for the dogs having a connection with the upper dog permitting of relative pivotal movement thereof, means for constraining the upper dog to move substantially parallel to the knee face throughout the greater portion of its range of movement and causing it to tilt to an inclined position as it approaches the upper limit of its travel.

EDWIN H. PERCY.